United States Patent
Fernandez Cox

[11] Patent Number: 5,918,450
[45] Date of Patent: Jul. 6, 1999

[54] BLADE SHAPE

[75] Inventor: Juan Eduardo Fernandez Cox, Aldenhoven, Germany

[73] Assignee: Kraemer-Maschinen U. Druckluftsysteme GmbH, Pulheim, Germany

[21] Appl. No.: 08/860,647

[22] PCT Filed: Dec. 27, 1995

[86] PCT No.: PCT/EP95/05136

§ 371 Date: Jun. 27, 1997

§ 102(e) Date: Jun. 27, 1997

[87] PCT Pub. No.: WO96/20585

PCT Pub. Date: Jul. 11, 1996

[30] Foreign Application Priority Data

Dec. 30, 1994 [DE] Germany ............................ 44 47 274

[51] Int. Cl.[6] ...................................................... A01D 34/73
[52] U.S. Cl. ........................... 56/255; 56/295; 56/DIG. 17
[58] Field of Search ............................ 56/255, 295, 17.5, 56/DIG. 17, DIG. 20

[56] References Cited

U.S. PATENT DOCUMENTS 3,214,896  11/1965  Watkins et al. ........................... 56/295
5,412,873  5/1995  Gibson .......................... 56/DIG. 20 X

FOREIGN PATENT DOCUMENTS 2071627  12/1993  Canada .

*Primary Examiner*—Terry Lee Melius
*Attorney, Agent, or Firm*—Kenyon & Kenyon

[57] ABSTRACT

The sharpness or efficiency of cutting edges of blade rails or other blades used in mowing mechanisms is very rapidly lost on meeting a obstacle. The blade shape of this invention, presents a cutting edge including a series of adjacent parallel recesses transversely to the cutting edge on the top of the blade. This gives equidistant thin and complete material. A differentiation is made on the cutting edge between the protective material (full thickness) and sharp edges (recesses). Experience has shown that, on the encountering of an obstacle, the cutting edge (thin Material) is protected by the full material to its left and right which results in a long useful life with relatively constant cutting efficiency.

14 Claims, 1 Drawing Sheet

BLADE SHAPE

FIELD OF INVENTION

This invention relates to a cutting blade (cutting geometry), having a plurality of recesses disposed along its cutting edge, which is resistant to dulling from ordinary use and that is particularly useful for replacement blades in rotary mowing equipment.

BACKGROUND OF THE INVENTION

Whether it be on replaceable blades or blades meant to be re-sharpened, e.g., a cutter bar for a sickle mower, every cutting edge has a relatively short useful life because the sharp cutting edge is worn or dulled whenever it collides with an obstacle. Eventually, the wear progresses to a point where the cutting edge no longer cuts, but rather knocks off (fractures) portions of the material the blade collides with.

Whether worn blades are to be replaced or sharpened, some dismantling and reassembly of the cutting machine is required. Those skilled in the art will appreciate how time-consuming frequent changing of the cutting blades can be.

German Patent DE-PS 221 144, describes a blade shape for replaceable blades for mowing equipment in which a number of grooves angularly disposed and lying parallel to one another are arranged on the bottom of the blade to provide a saw-like cutting edge.

As a result of wear, this blade's cutting edge becomes more saw-like with the result that sharpening is not necessary. That is to say, wear on the thin material in the area of the indentations creates a form of saw-teeth, as shown in FIG. 4 of the German Patent, which first grab the material to be cut, e.g., blades of grass, and then tear through them. Even though reference is made to a blade here, a saw is in fact what is described. The disadvantages of a saw are well-know: in the case of fresh green material, the blades are soon clogged with cutting debris, deformations can also result.

U.S. Pat. No. 3,382,654 describes a cutter bar for sickle mowers which is made of plastic. Plastic parts of lower wear-resistance are inserted in recesses on the cutting edge of this cutter bar. In contrast to the instant invention, these inserts form a continuous cutting edge when placed in their corresponding recesses and do not leave any areas of low thickness of material.

As a result of (uneven) wear on the plastic inserts having lower wear-resistance, the cutting edge creates a saw-tooth edge. As noted above, a disadvantage of saw-tooth cutting action is the accumulation of debris that blocks the cutting edge. It must also be stated that this prior art invention does not take into account the facts that the parts of low wear resistance are very quickly dulled, the final cutting is done by a sharp exposed point and that such devices are expensive to manufacture.

OBJECTS AND SUMMARY OF THE INVENTION

It is an object of the present invention to provide a cutting blade, e.g., blade sickle cutter bars, having improved wear-resistance and cutting performance, and that can be manufactured easily and inexpensively.

The present invention provides an improved cutting blade comprising a blade body including an upper surface and a cutting edge; and a plurality of recesses formed in the upper surface of the blade body so that the cutting edge is defined by a plurality thin sharp cutting regions each disposed between thick protective regions.

In the present invention, the full material (thick regions) acts as a protection for the sharp cutting edges (thin regions) therebetween. The transverse orientation of the cutting edge, i.e., not at an angle, is intended to avoid forming saw-like tips by wear. The thin cutting regions (recesses) remain sharp through the protection—left and right—of the thick (full material) regions.

It is recesses—not grooves—which present a constant thickness of material from behind, in order to form the sharp cutting regions in the best possible way across the entire width (see FIGS. 1 and 2).

The recesses are on the upper side of the blade, which also prevents grass from sliding along the cutting edge. The grass comes into contact with the upper edge of the blade and is held by the elevations, which makes the cutting process easier and considerably increases the cutting performance, even with a medium radius of the blade.

The invention further results in the kinetic energy of rotating elements being efficiently transmitted to the material cut off (through the above-mentioned holding of the material to be cut) in order to transport it in the direction of the discharge end of the mower. For example, it can be seeing in lawn-mowing that the grass is ejected much farther.

As a result both the mown surface and also the rotating blades themselves remain free of clinging cutting debris.

Through the idea of this invention, a small sharp piece of the blade is protected against wear by the existence of full material on both sides. The sharp segment is then repeated at short intervals all along the blade.

DETAILED DESCRIPTION OF THE INVENTION

Figure 1:
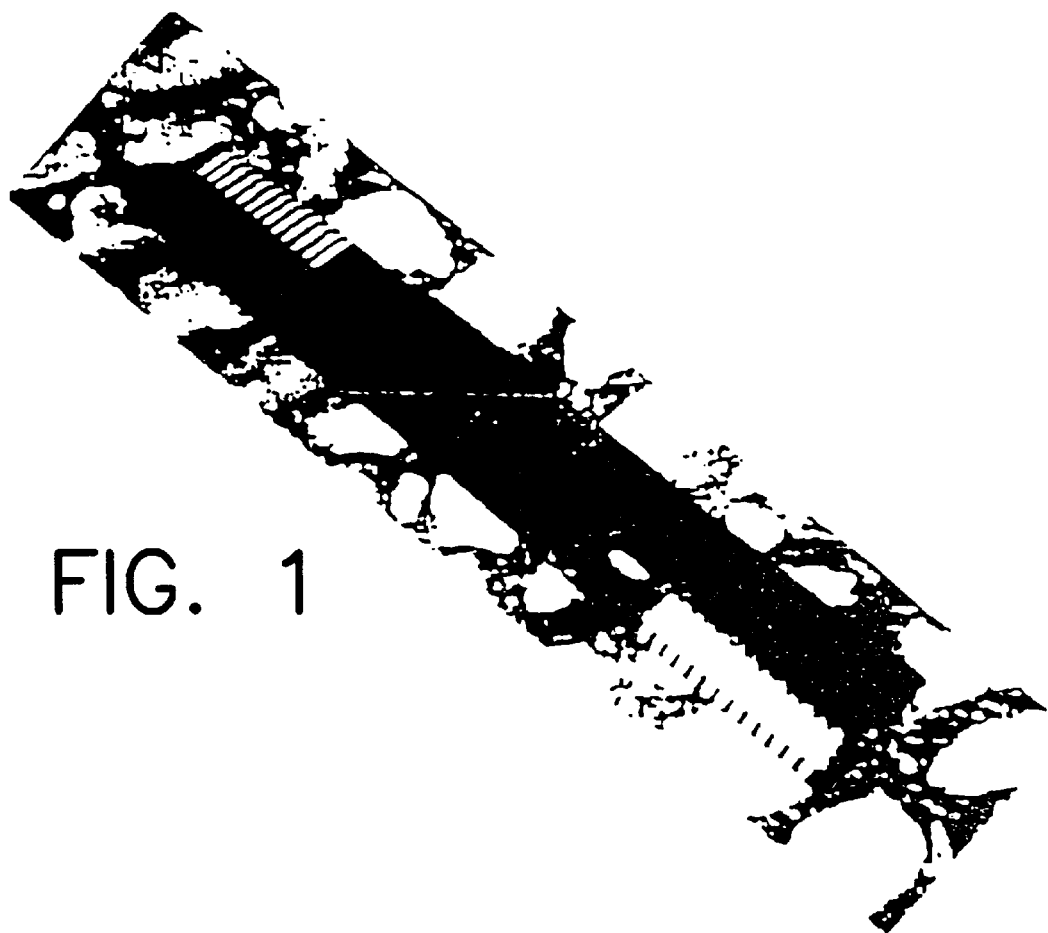
FIG. 1 illustrates a cutter bar for a sickle mower with a plurality of recesses, here colored white.
Figure 2:
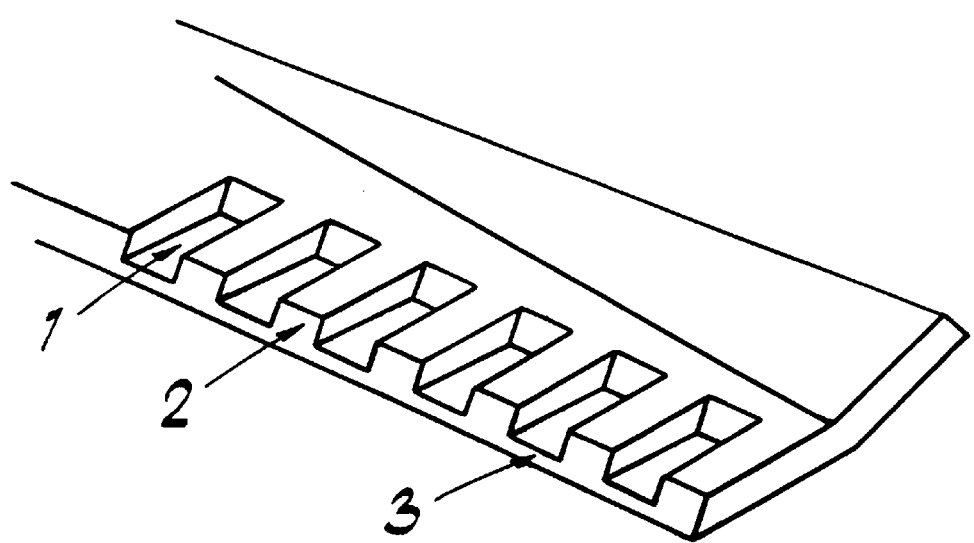
FIG. 2 illustrates the recesses in a mowing blade constructed in accordance with the present invention.

As can be seen in FIGS. 1 and 2, recesses (1) may be disposed parallel to each other and at regular intervals in the top surface of the blade in the transverse direction and along the cutting edge. The length of the recesses (1) is, for example, no more than 30 mm. The recesses (1) leave 1.2 mm to 1.7 mm of material for forming the thin cutting regions (3) which may be sharpened by wear. Between or adjacent to the recesses (1), are full material thicknesses (2), i.e., thick regions, which protect the cutting surfaces from wear.

I claim:

1. An improved cutting blade comprising:
   a blade body including an upper surface and a leading edge, the leading edge defining an axis; and
   a plurality of recesses formed in the upper surface of the blade body so that the leading edge is defined by a plurality of thin sharp cutting regions each extending along the axis and being disposed between thick protective non-cutting regions.

2. The improved cutting blade recited in claim 1, wherein the recesses have a length less than or equal to about 30 mm.

3. The improved cutting blade recited in claim 2, wherein the cutting regions are about 1.2 mm to about 1.7 mm thick.

4. The improved cutting blade recited in claim 3, wherein the recesses are positioned parallel to one another at regular intervals and transverse to the leading edge.

5. The improved cutting blade recited in claim 4, wherein the blade body is adapted to connection with a rotating mower machine.

6. The improved cutting blade recited in claim 5, wherein the rotating mower machine is a sickle mower.

7. The improved cutting blade recited in claim 6, wherein the blade body is adapted to connection with a rotating mower machine.

8. A method for making an improved cutting blade comprising the steps of:

forming a blade body including an upper surface and a leading edge, the leading edge defining an axis; and forming a plurality of recesses in the upper surface of the blade body so that the leading edge is defined by a plurality of thin sharp cutting regions each extending along the axis and being disposed between thick protective non-cutting regions.

9. The method recited in claim 8, wherein the recesses have a length less than or equal to about 30 mm.

10. The method recited in claim 9, wherein the cutting regions are about 1.2 mm to about 1.7 mm thick.

11. The method recited in claim 10, wherein the recesses are positioned parallel to one another at regular intervals and transverse to the leading edge.

12. The method recited in claim 11, wherein the blade body is adapted to connection with a rotating mower machine.

13. The method recited in claim 12, wherein the rotating mower machine is a sickle mower.

14. The method recited in claim 8, wherein the blade body is adapted to connection with a rotating mower machine.

* * * * *